UNITED STATES PATENT OFFICE.

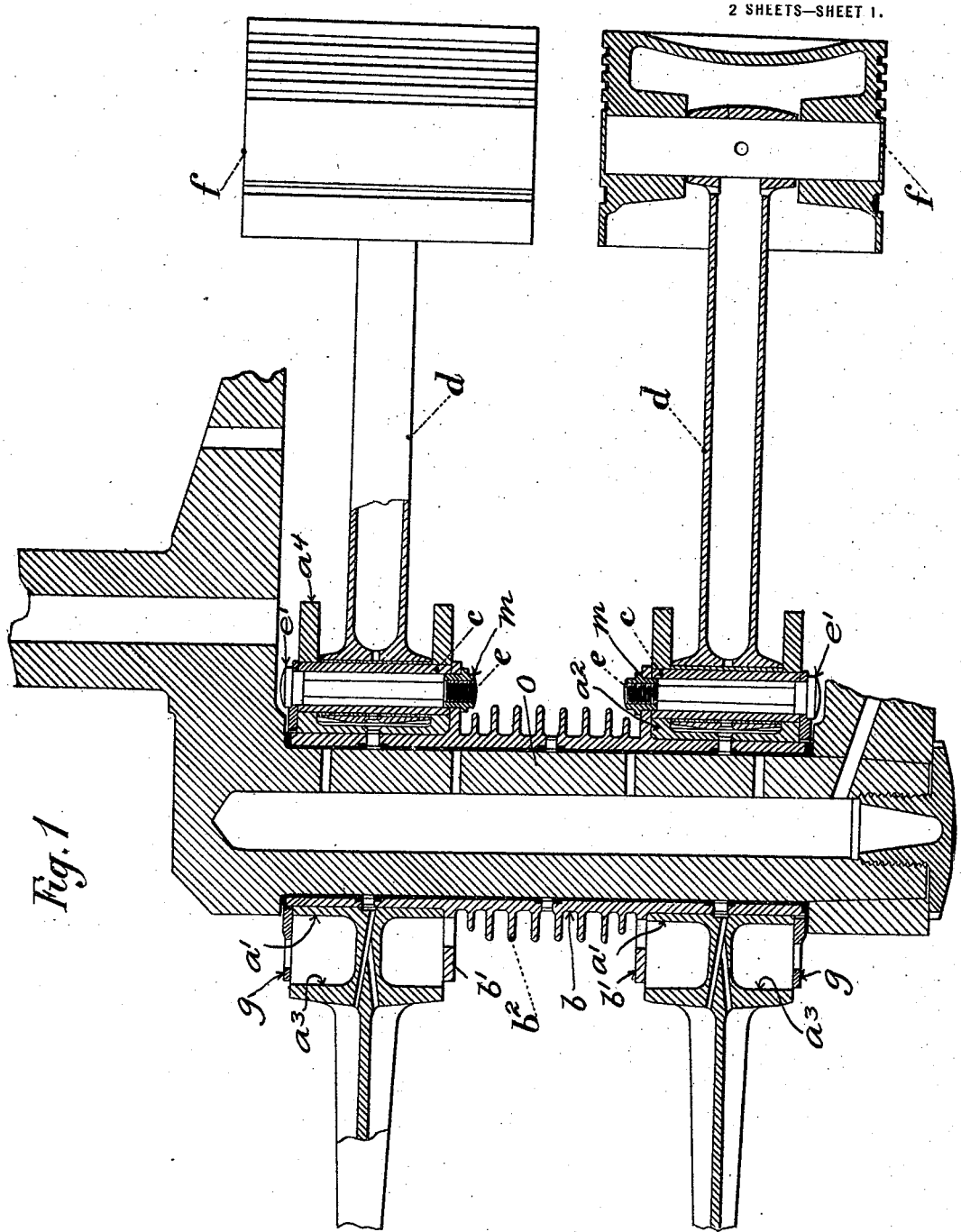

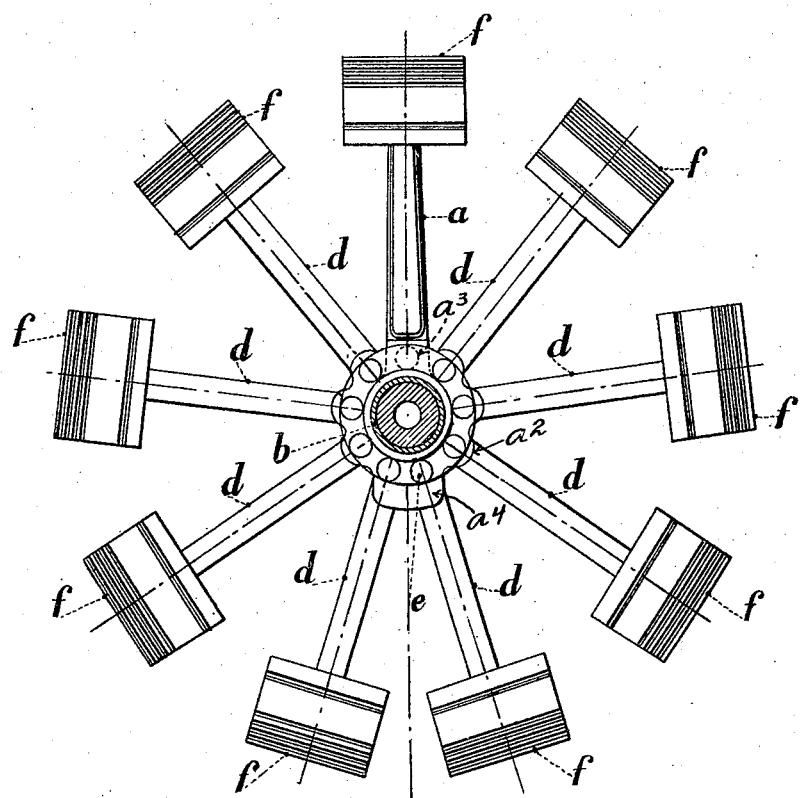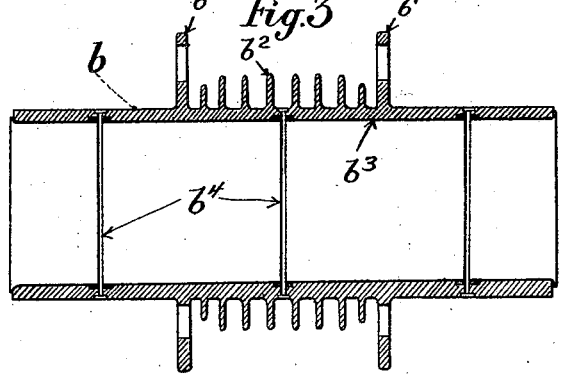

PIERRE JEAN RENÉ POSTEL-VINAY, OF PARIS, FRANCE, ASSIGNOR TO SOCIETE DES MOTEURS SALMSON (SYSTEME CANTON-UNNE,) OF BILLANCOURT, SEINE, FRANCE.

PISTON-ROD CONNECTION FOR EXPLOSION ENGINES.

1,413,682.   Specification of Letters Patent.   Patented Apr. 25, 1922.

Application filed December 20, 1918. Serial No. 267,724.

*To all whom it may concern:*

Be it known that I, PIERRE JEAN RENÉ POSTEL-VINAY, citizen of the Republic of France, residing at 46 Boulevard de la Tour-Maubourg, Paris, Seine, in the Republic of France, have invented new and useful Improvements in Piston-Rod Connections for Explosion Engines, of which the following is a specification.

This invention relates to an arrangement of the piston rods in an aviation engine in which the main rods are rigidly connected by means of bolts to a plain bushing, or floating sleeve which is freely supported upon the crank pin of the engine shaft, the secondary piston rods being pivoted to the main piston rods.

In the annexed drawings which show by way of example one embodiment of the invention.

Fig. 1 is a longitudinal section along the axis of the engine shaft.

Fig. 2 is a side view, partly in section.

Fig. 3 is a longitudinal section of the bushing or floating sleeve.

As shown in the drawings, each of the main connecting rods $a$ has a big end integral with the body of the connecting rod and comprising a central bushing $a^1$ and two side flanges $a^2$. Two opposite blind holes $a^3$ are drilled in the part of the connecting rod body adjacent the central bushing for the purpose of reducing weight. $a^4$ is a projecting part integral with each side flange and acting as a counterweight for the connecting rod body. The central bushings $a^1$ of the main connecting rods are mounted upon cylindrical parts of a floating sleeve $b$ fitted over the crank pin $o$ of the engine shaft and bear laterally at one end, together with the corresponding side flange $a^2$, against flanges $b^1$ provided on said sleeve $b$. The side flanges $a^2$ of the main connecting rods $a$ have cylindrical bores formed in the same, through which hollow cross pins $c$ extend, the secondary piston rods $d$ being pivoted on said cross pins in the space between the side flanges $a^2$. Extending through the bore of said cross pins $c$, are bolts $e$ which are used for securing the main piston rods $a$ to the flanges $b^1$ of the floating sleeve $b$, which flanges are provided with suitably arranged holes for that purpose.

The bolts $e$ are provided at one end with a head $e^1$ and a cylindrical portion fitting within the bore of the hollow cross pins $c$. The bolt head has a bearing against a thrust collar $g$. The other end of the bolt is threaded and carries a nut $m$ having a cylindrical portion which fits within the bore of the cross pin.

Fig. 2 shows the general arrangement of the main rod $a$ and secondary rods $d$ around the floating sleeve $b$.

In the operation of the engine, the strains which are successively transmitted from the pistons $f$ to the piston rods are distributed over the whole bearing surface of the sleeve $b$ upon the engine shaft whereby the friction between the parts is uniformly distributed.

The floating sleeve $b$ is provided with cooling fins $b^2$, is lined interiorly with an antifriction layer $b^3$ and has the usual lubricating conduits $b^4$ formed therein.

Having now described my invention, what I claim as new and desire to secure by Letters Patent is:

1. In an explosion engine, the combination of an engine shaft having a crank pin, a floating sleeve journaled on the crank pin, a plurality of series of connecting rods, each series arranged radially about the crank pin and sleeve, said connecting rods comprising in each series one main connecting rod and secondary connecting rods, means for rigidly securing the main connecting rod to said floating sleeve and means for securing the secondary connecting rods to the main connecting rod.

2. In an explosion engine, the combination of an engine shaft having a crank pin, a floating sleeve journaled on the crank pin, a plurality of series of connecting rods, each series arranged radially about the crank pin and sleeve, said connecting rods comprising in each series one main connecting rod and secondary connecting rods, a flange on said floating sleeve for each series of connecting rods, hollow pins carried in the main conecting rod in each series about which the secondary connecting rods are pivoted respectively, bolts extending through the flange on the floating sleeve and the hollow pins and nuts on said bolts, the bolts and the nuts being adapted at the same time to securely hold the main connecting rod to the flange and the hollow pins in the main connecting rod.

3. In an explosion engine, the combination of an engine shaft having a crank pin, a floating sleeve journaled on the crank pin, a plurality of series of connecting rods, each series arranged radially about the crank pin and sleeve, said connecting rod comprising in each series one main connecting rod and secondary connecting rods, said floating sleeve being provided with cooling fins, means for securing the main connecting rod to said floating sleeve and means for securing the secondary connecting rods to the main connecting rod.

In testimony whereof I have signed my name to this specification.

PIERRE JEAN RENE POSTEL-VINAY.